United States Patent
Awada et al.

(10) Patent No.: US 8,024,544 B2
(45) Date of Patent: Sep. 20, 2011

(54) FREE RESOURCE ERROR/EVENT LOG FOR AUTONOMIC DATA PROCESSING SYSTEM

(75) Inventors: Faisal M. Awada, Round Rock, TX (US); Joe Nathan Brown, Austin, TX (US); Philip Bernard Burkes, Round Rock, TX (US); Victor Espinoza, Jr., Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1760 days.

(21) Appl. No.: 10/845,534

(22) Filed: May 13, 2004

(65) Prior Publication Data

US 2005/0268065 A1    Dec. 1, 2005

(51) Int. Cl.
*G06F 12/02* (2006.01)
(52) U.S. Cl. ......... 711/173; 711/170; 711/171; 718/104
(58) Field of Classification Search .................. 711/173, 711/170, 171; 718/104
See application file for complete search history.

(56) References Cited

U.S. PATENT DOCUMENTS

| | | | |
|---|---|---|---|
| 4,528,624 A * | 7/1985 | Kamionka et al. ............ | 718/104 |
| 6,279,098 B1 * | 8/2001 | Bauman et al. ................ | 712/13 |
| 6,295,619 B1 | 9/2001 | Hasbun et al. | |
| 6,477,682 B2 | 11/2002 | Cypher | |
| 6,701,464 B2 | 3/2004 | Austen et al. | |
| 2002/0124215 A1 * | 9/2002 | Austen et al. ................... | 714/57 |
| 2003/0017808 A1 * | 1/2003 | Adams ............................ | 455/76 |
| 2003/0163651 A1 | 8/2003 | Jain et al. | |
| 2005/0160329 A1 * | 7/2005 | Briggs et al. ................... | 714/54 |

OTHER PUBLICATIONS

China Patent Office; Office Action dated Sep. 29, 2006.
Response to China Office Action dated Sep. 29, 2006.
Taiwan Patent office search for application 094114172 dated Oct. 26, 2010.
China Patent Office; Office Action dated Sep. 29, 2006.
Response to China Office Action dated Sep. 29, 2006.
Prior Art text pertaining to the China Office Action dated Sep. 29, 2006.

* cited by examiner

*Primary Examiner* — Jae U Yu
(74) *Attorney, Agent, or Firm* — Yee & Associates, P.C.; Matthew W. Baca

(57) ABSTRACT

System, method, and computer program product for monitoring resources capable of being assigned to different partitions of a data processing system from a free resources pool of the data processing system. A free resources event log is associated with the free resources pool for maintaining a log of events for each resource that is in the free resources pool. When a resource is assigned to a partition from the free resources pool, a log of events for the assigned resource is transferred from the free resources event log to an event log associated with the partition.

17 Claims, 9 Drawing Sheets

FREE RESOURCE ERROR/EVENT LOG FOR AUTONOMIC DATA PROCESSING SYSTEM

TECHNICAL FIELD

The present invention relates generally to the data processing field, and, more particularly, to a system, method and computer program product for monitoring resources capable of being assigned to different partitions of a data processing system from a free resources pool of the data processing system.

DESCRIPTION OF RELATED ART

Increasingly, large symmetric multi-processor data processing systems are not being used as single large data processing systems; but are being partitioned and used as a plurality of smaller systems. These systems are commonly referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system runs, is assigned a non-overlapping subset of platform resources. These platform resources may include one or more architecturally distinct processors with their interrupt management area, regions of system memory, and input/output (I/O) adapter bus slots. The partition's resources are represented by the platform's firmware to the operating system.

Each operating system running within a platform is protected from other operating systems such that software errors in one logical partition cannot affect the correct operations of any of the other partitions. This protection is provided by allocating a disjointed set of platform resources to be directly managed by each operating system and by providing mechanisms for insuring that the various operating systems cannot control any resources that have not been allocated to that system. Furthermore, software errors in the control of an operating system's allocated resources are prevented from affecting the resources of any other operating system. Thus, each operating system directly controls a distinct set of allocatable resources within the platform.

With respect to hardware resources in a logical partitioned data processing system, these resources are disjointly shared among various partitions. Hardware resources may include, for example, input/output (I/O) adapters, memory DIMMs, non-volatile random access memory (NVRAM), and hard disk drives.

In an autonomic data processing system, for example, a Dynamic Logical Partitioned (DLPAR) data processing system or a Dynamic Capacity Upgrade on Demand (DCUoD) data processing system, allocatable resources are often moved between a free resources pool and logical partitions in order to meet the dynamic workload requirements of a partition. An important aspect of autonomic computing is the ability of a server to "heal" itself. One technique for implementing self-healing is for the data processing system to replace a resource that is predicted to fail with a similar resource from a pool of available resources or by a capacity upgrade on demand resource. Failure prediction is typically achieved by analyzing logged errors associated with each resource.

A problem that exists in implementing this self-healing aspect of a data processing system is the inability of the system to monitor pertinent errors logged against a resource as the resource moves between a partition and the free resources pool, i.e., as the resource moves between a state in which the resource is assigned to a partition, and a state in which the resource is not assigned to a partition but is available for assignment as needed. In particular, errors that may have been logged against a resource while in a first partition are lost when the resource is subsequently moved from that partition to the free resources pool, and then later assigned to a second partition. If errors pertinent to predicting a failure of the resource were logged in the first partition while the resource was assigned to that partition, the resource can unexpectedly fail while assigned to the second partition since the errors logged against the resource while assigned to the first partition are unable to be considered for Predictive Failure Analysis (PFA) in the second partition.

It would, accordingly, be advantageous to accurately monitor resources capable of being assigned to different partitions of a data processing system from a free resources pool of the data processing system.

SUMMARY OF THE INVENTION

The present invention provides a system, method, and computer program product for monitoring resources capable of being assigned to different partitions of a data processing system from a free resources pool of the data processing system. A free resources event log is associated with the free resources pool for maintaining a log of events for each resource that is in the free resources pool. When a resource is assigned to a partition from the free resources pool, the log of events for the assigned resource is transferred from the free resources event log to an event log associated with the partition.

The invention permits resources capable of being assigned to different partitions of a data processing system from a free resources pool of the data processing system to be accurately monitored for Predictive Failure Analysis and for other purposes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
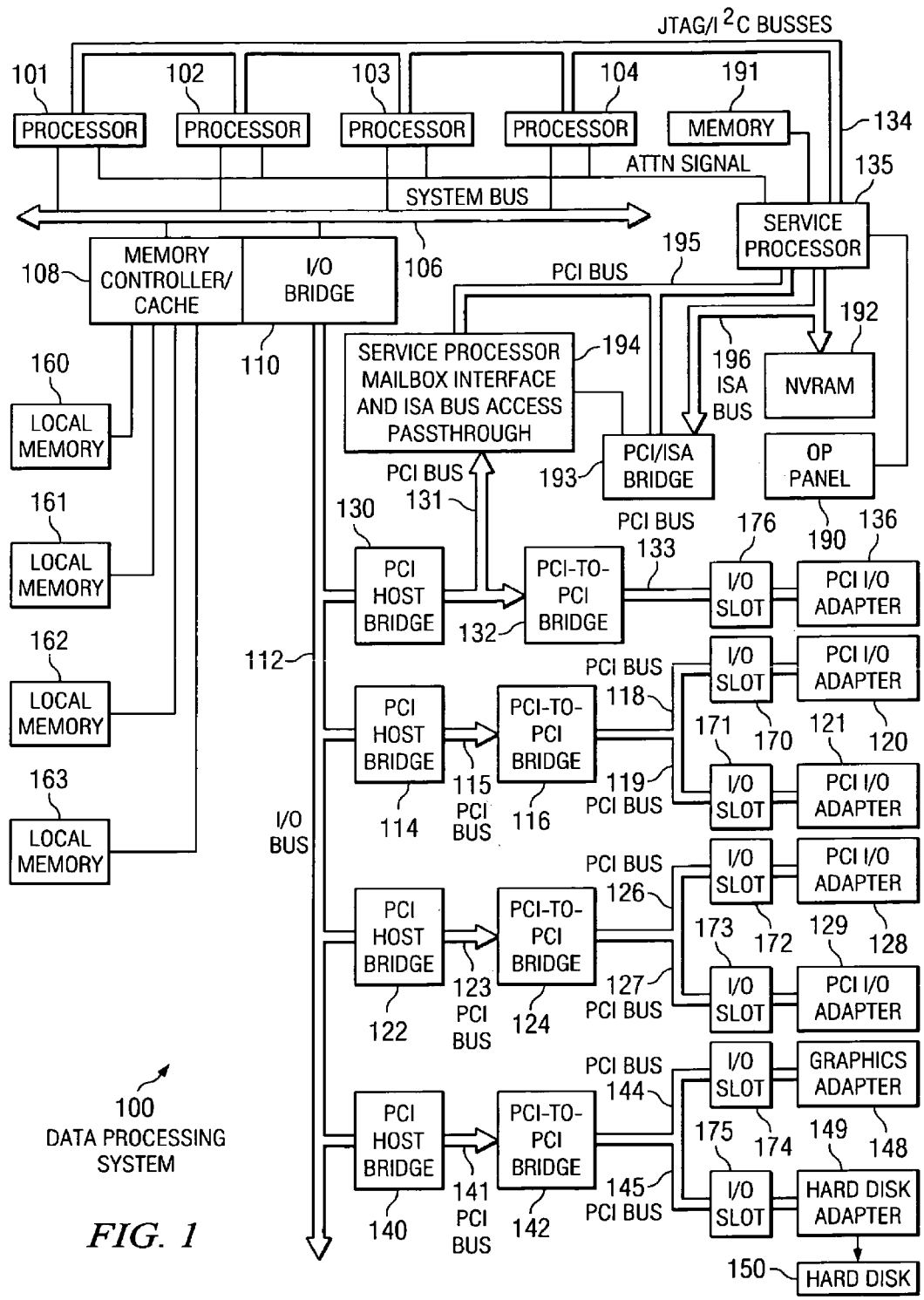
FIG. 1 is a block diagram of a data processing system in which the present invention may be implemented.

With reference now to the figures, FIG. 1 depicts a block diagram of a data processing system in which the present invention may be implemented. Data processing system 100 may be a symmetric multiprocessor (SMP) system including a plurality of processors 101, 102, 103, and 104 connected to system bus 106. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I²C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
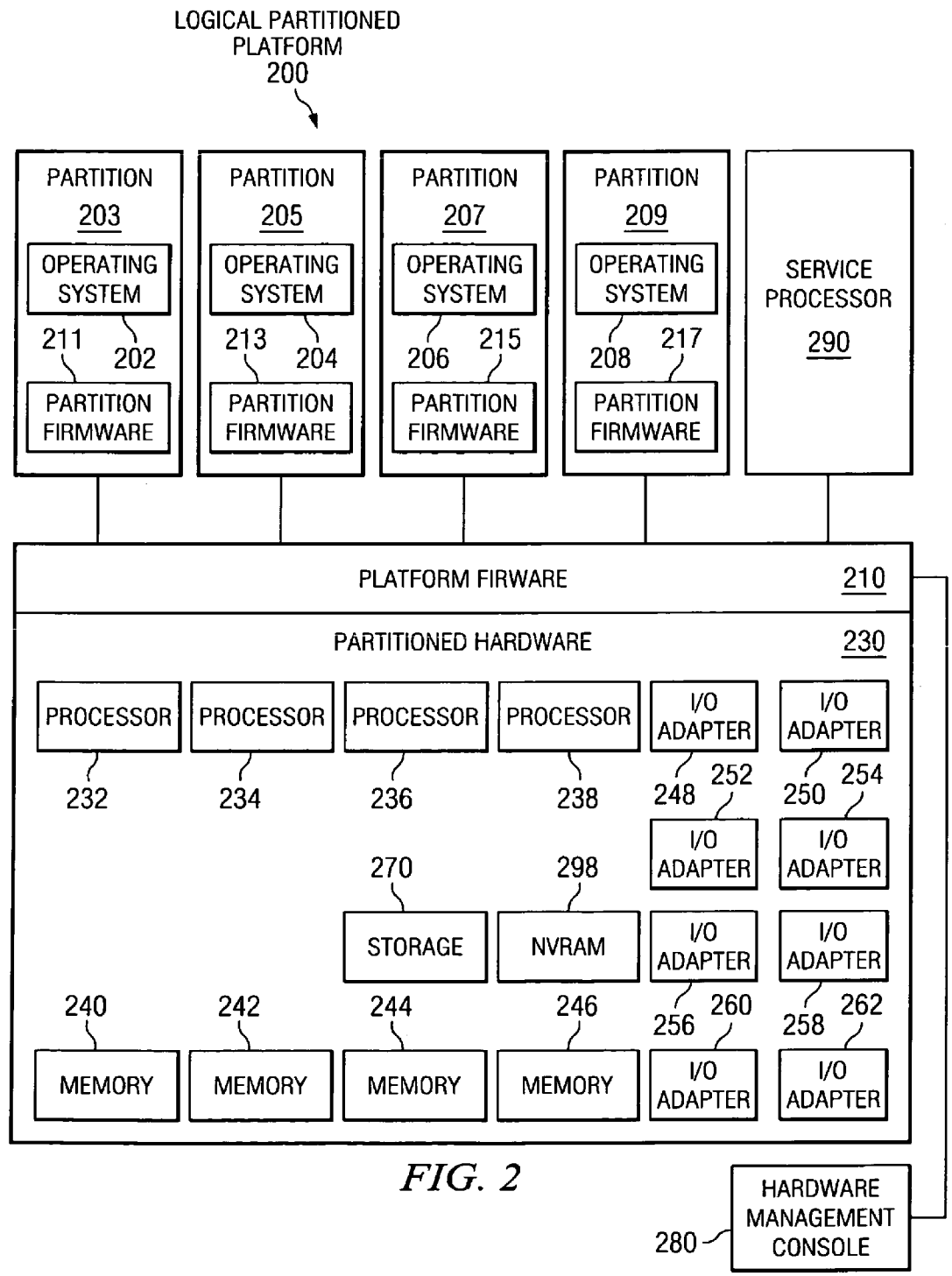
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using an OS/400 operating system available from International Business Machine Corporation of Armonk, N.Y., which is designed to interface with a partition management firmware, such as Hypervisor. OS/400 is used only as an example in these illustrative embodiments. Of course, other types of operating systems, such as AIX and Linux, may also be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

Figure 3A:
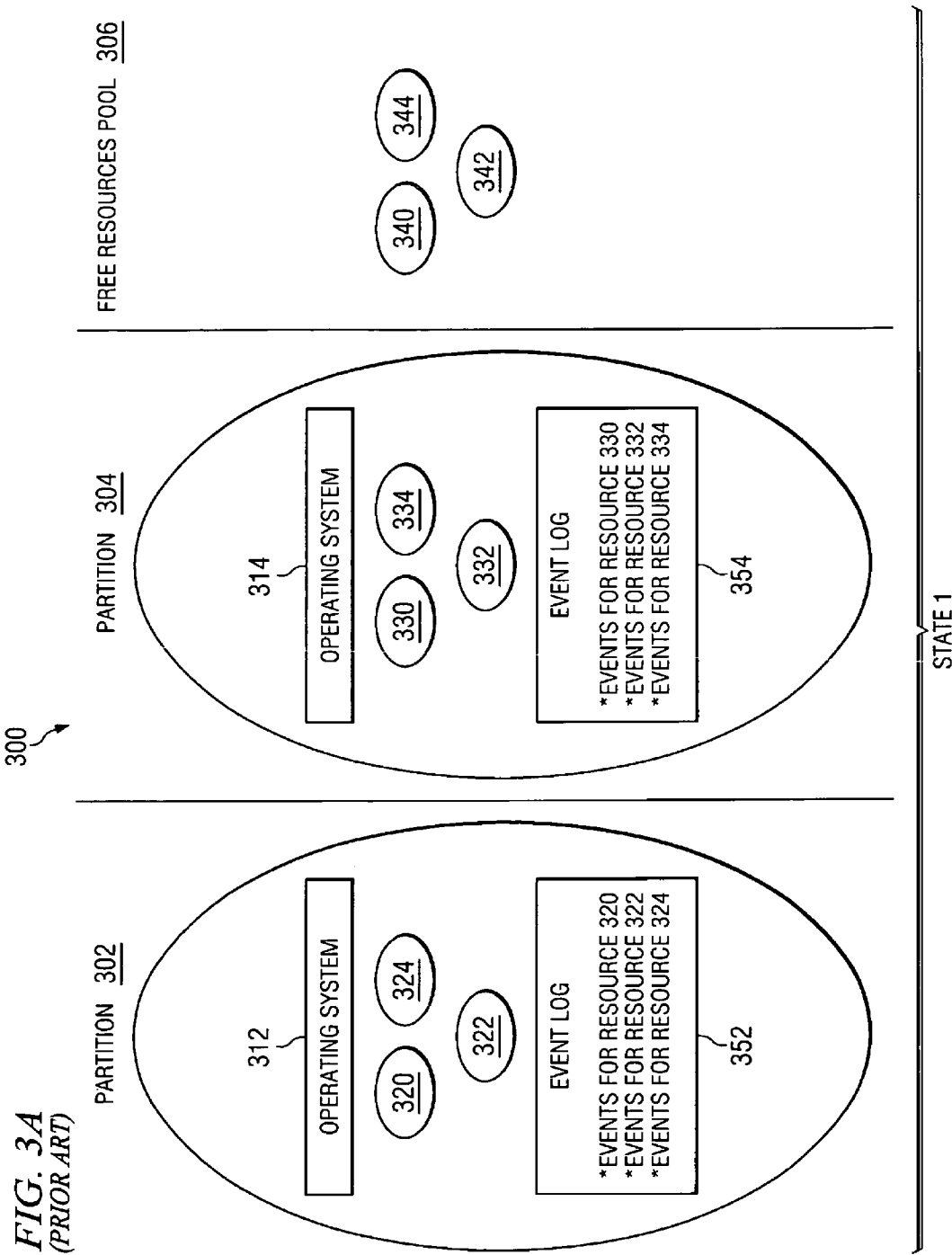
FIGS. 3A, 3B and 3C are diagrams that schematically illustrate a known procedure for monitoring resources capable of being assigned to different partitions of a data processing'system from a free resources pool of the data processing system in order to assist in explaining the present invention.
Figure 3B:
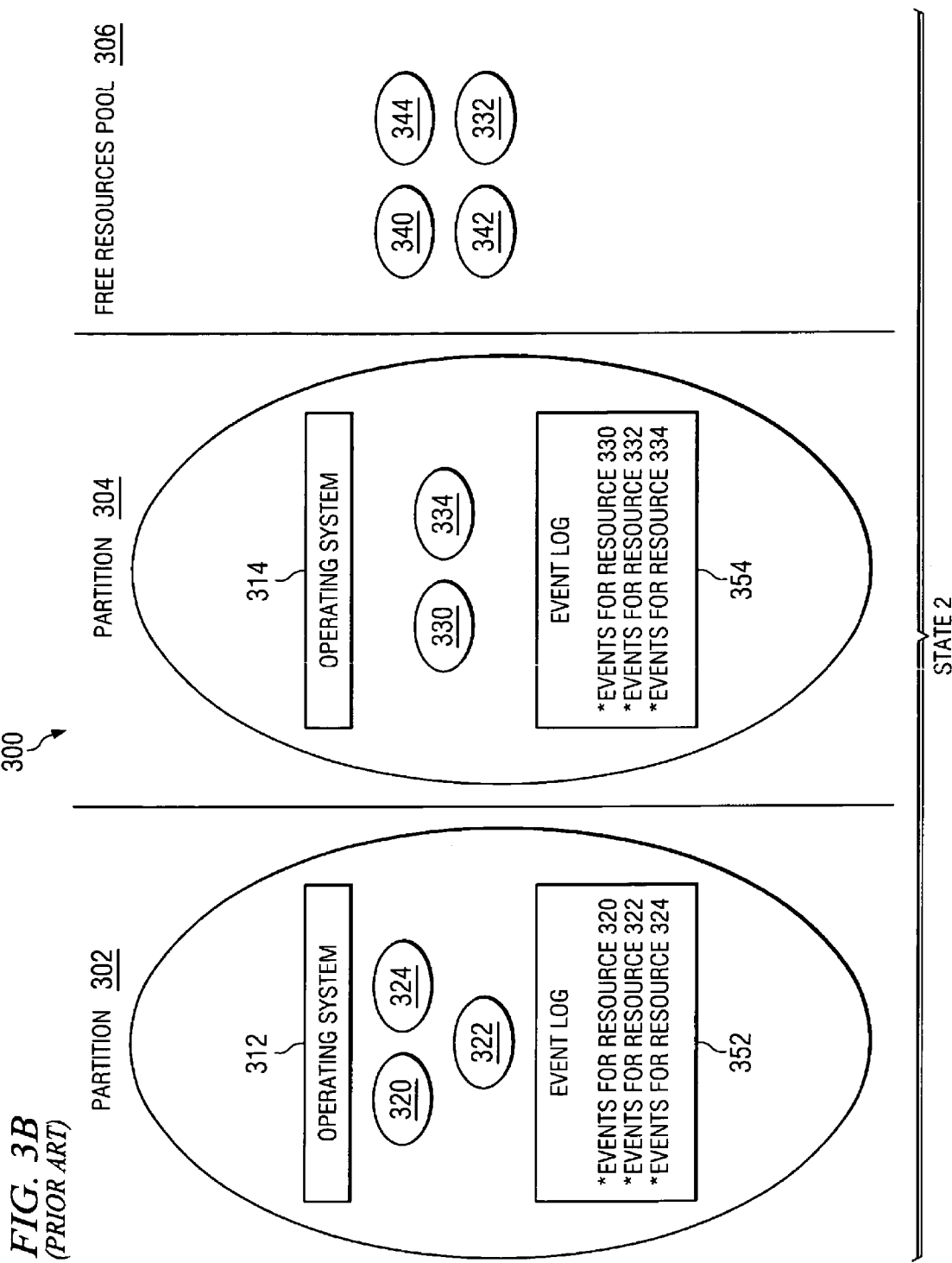
Figure 3C:
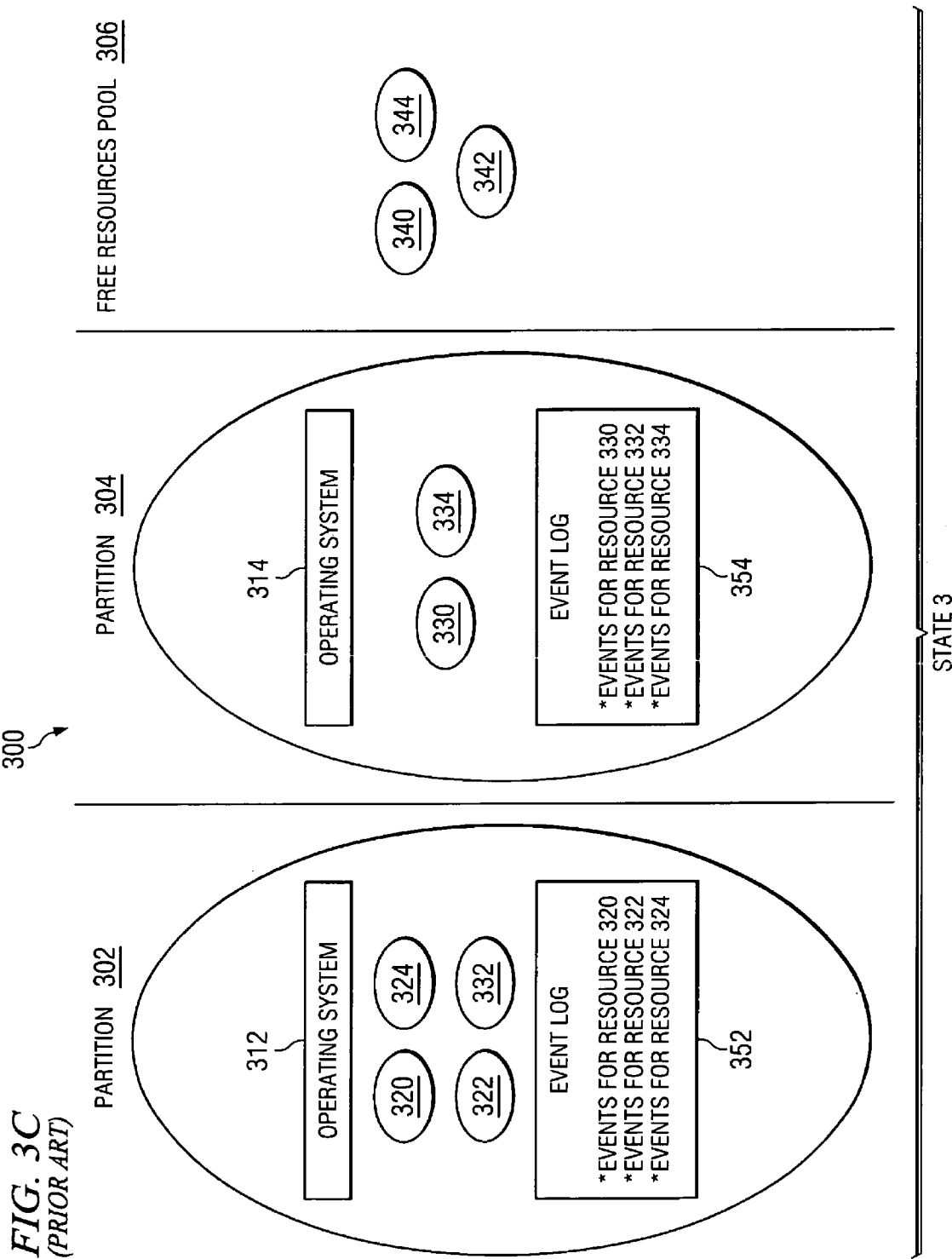

FIGS. 3A, 3B and 3C are diagrams that schematically illustrate a known procedure for monitoring resources capable of being assigned to different partitions of a data processing system from a free resources pool of the data processing system in order to assist in explaining the present invention. FIG. 3A illustrates State 1 of data processing system 300 having a plurality of logical partitions including partitions 302 and 304, and a free resources pool 306. Operating system 312 is running in partition 302 and operating system 314 is running in partition 304.

Three resources 320, 322 and 324 are assigned to partition 302; three resources 330, 332 and 334 are assigned to partition 304; and three resources 340, 342 and 344 are not currently assigned to any partition and are maintained in free resources pool 306. Resources 340, 342 and 344 in free resources pool 306 are available for assignment to any of the plurality of partitions in data processing system 300; including partitions 302 and 304, as the need arises. Resources 320-324, 330-334 and 340-344 may, for example, be I/O adapters or devices that are connected to system 300 through I/O adapters.

Event log 352 is associated with partition 302 and event log 354 is associated with partition 304. Event logs 352 and 354 maintain a log of events associated with each of the resources assigned to partitions 302 and 304, respectively. The events may be the result of some error condition encountered by a resource, or some informational type of message associated with a resource. Events in an event log are commonly used to predict a failure of a resource based on an analysis of the event history of the resource.

As illustrated in FIG. 3A, event log 352 associated with partition 302 includes a log of events for each of resources 320, 322 and 324 assigned to partition 302. Event log 354 associated with partition 304 includes a log of events for each of resources 330, 332 and 334 assigned to partition 304.

FIG. 3B illustrates State 2 of data processing system 300. In State 2, resource 332 has been moved from partition 304 to free resources pool 306, for example, as a result of having satisfied a temporary need for the resource in partition 304. As shown in FIG. 3B, the events for resource 332 in event log 354 associated with partition 304 remain in event log 354 after resource 332 has been moved to free resources pool 306.

FIG. 3C illustrates State 3 of data processing system 300. In State 3, resource 332 has now been assigned to partition 302 from free resources pool 306, for example, due to a need to satisfy increased I/O requirements of partition 302. Note that events for resource 332 that occurred while resource 332 was assigned to partition 304 remain in event log 354 associated with partition 304.

Figure 4A:
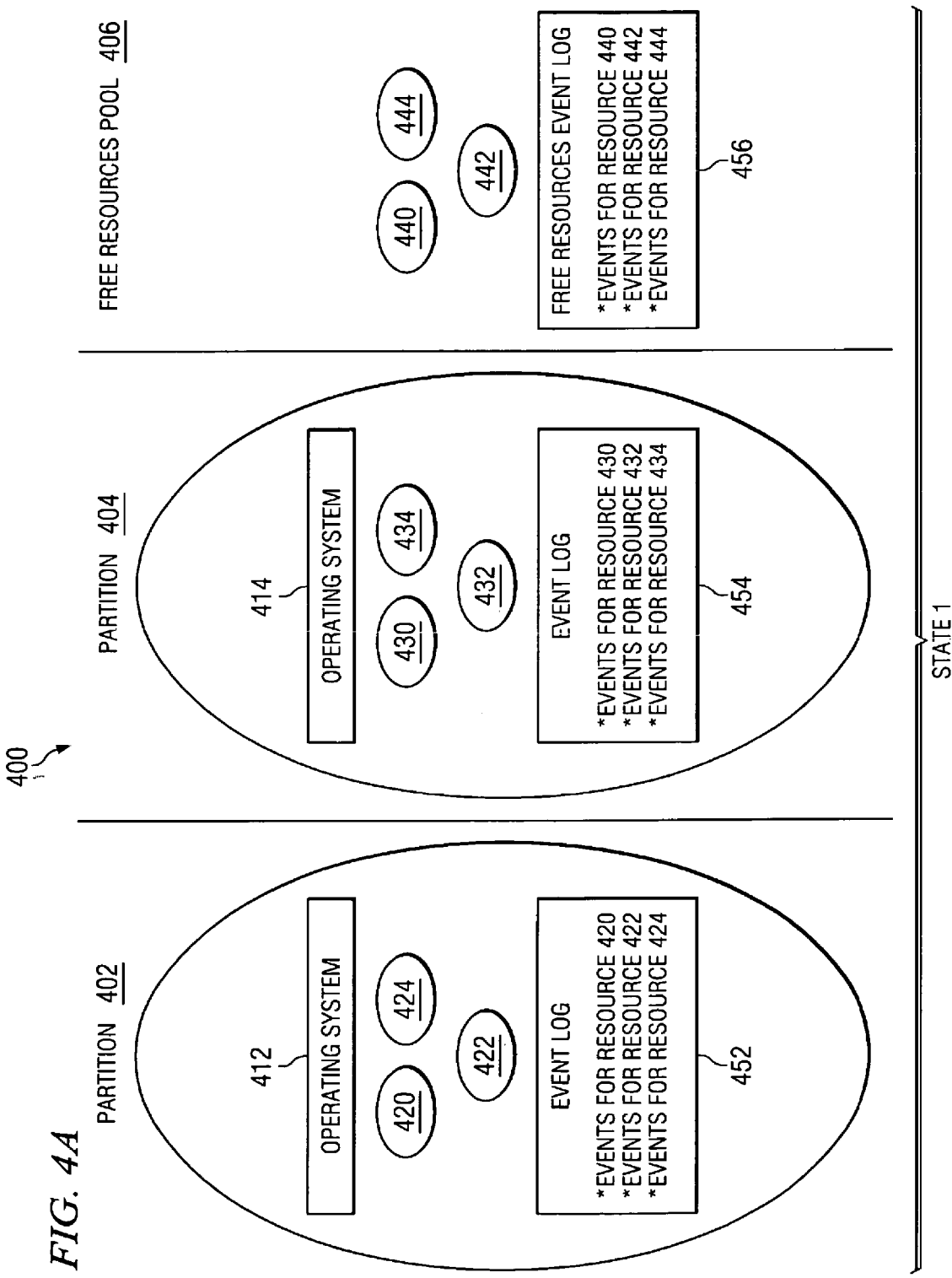
FIGS. 4A, 4B and 4C are diagrams that schematically illustrate a procedure for monitoring resources capable of being assigned to different partitions of a data processing system from a free resources pool of the data processing system in accordance with a preferred embodiment of the present invention.
Figure 4B:
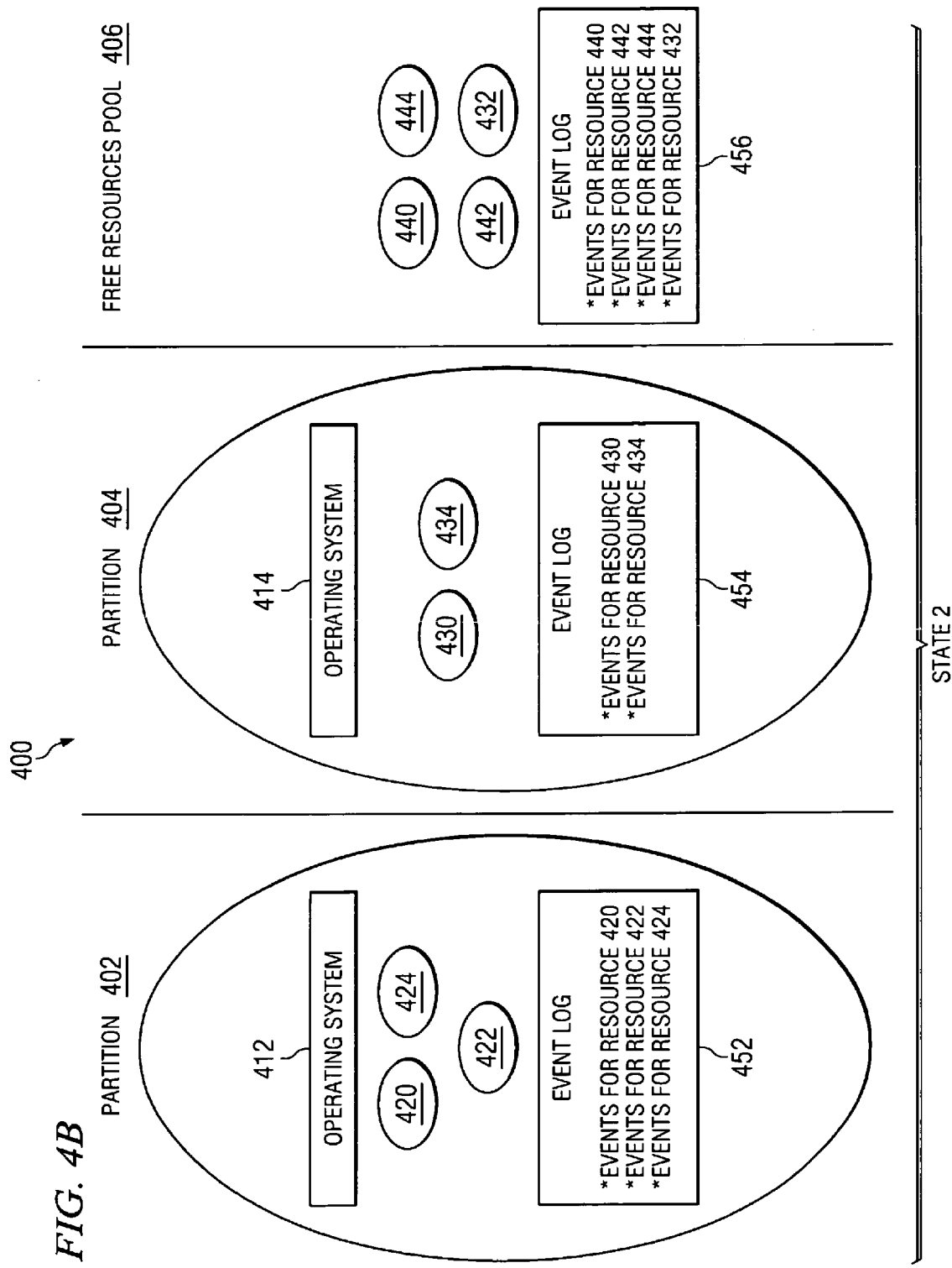
Figure 4C:
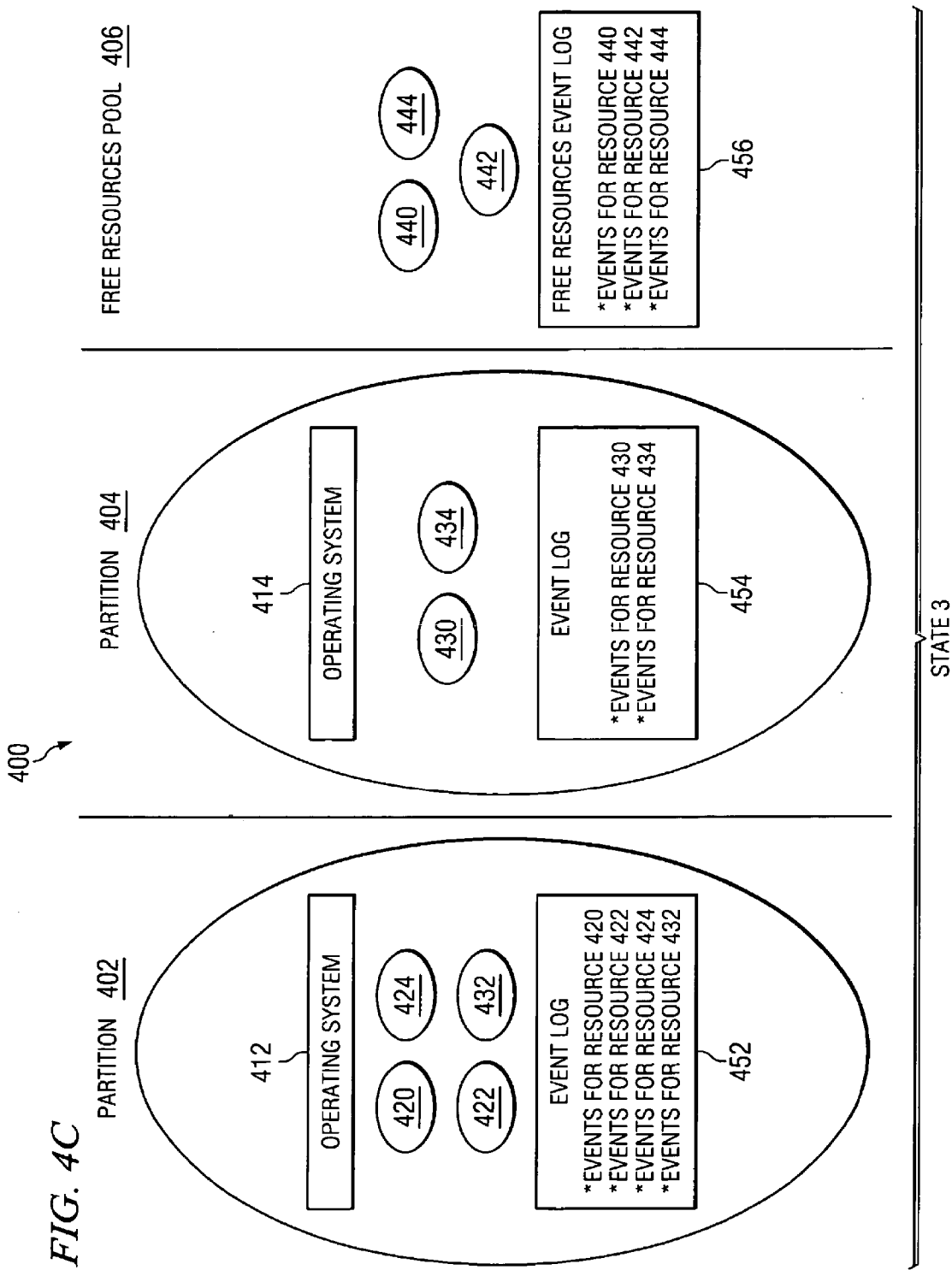

FIGS. 4A, 4B and 4C are diagrams that schematically illustrate a procedure for monitoring resources capable of being assigned to different partitions of a data processing system from a free resources pool of the data processing system in accordance with a preferred embodiment of the present invention. FIG. 4A illustrates State 1 of data processing system 400 having a plurality of logical partitions including partitions 402 and 404, and a free resources pool 406. Operating system 412 is running in partition 402 and operating system 414 is running in partition 404.

Three resources 420, 422 and 424 are assigned to partition 402; three resources 430, 432 and 434 are assigned to partition 404; and three resources 440, 442 and 444 are not currently assigned to any partition and are maintained in free resources pool 406. Resources 440, 442 and 444 in free resources pool are available for assignment to any of the plurality of partitions in data processing system 400; including partitions 402 and 404, as the need arises.

Data processing system 400 illustrated in FIGS. 4A-4C differs from data processing system 300 illustrated in FIGS. 3A-3C in that data processing system 400 includes a Free Resources Event Log (FREL) 456 that is associated with free resources pool 406. FREL 456 includes a log of events for resources in free resources pool 406. In particular, events logged in FREL 456 are the result of events that occurred with respect to resources 440, 442 and 444 when the resources were assigned to a partition of data processing system 400 such as one of partitions 402 and 404.

In State 1 of data processing system 400 illustrated in FIG. 4A, FREL 456 includes a log of events for resources 440, 442 and 444 in free resources pool 406.

FIG. 4B illustrates State 2 of data processing system 400. In State 2, resource 432 has been moved from partition 404 to free resources pool 406, for example, as a result of having satisfied a temporary need for the resource in partition 404. As shown in FIG. 4B, the log of events for resource 432 in event log 454 associated with partition 404 has been moved from event log 454 to FREL 456 along with the move of resource 432 to free resources pool 406. Thus, in State 2, FREL 456 also includes a log of events for resource 432 as well as a log of events for resources 440, 442 and 444 that remain in FREL 456.

FIG. 4C illustrates State 3 of data processing system 400. In State 3, resource 432 has now been assigned to partition 402 from free resources pool 406. As shown in FIG. 4C, events in FREL 456 associated with resource 432 has also been moved from FREL 456 to event log 452 associated with partition 402 along with the move of resource 432 from free resources pool 406 to partition 402.

In system 300 illustrated in FIGS. 3A-3C, operating system 312 in partition 302 has no visibility to the event history of resource 332 while the resource was assigned to partition 304 or to any other partition of data processing system 300. This lack of information can prevent an application from making an accurate failure prediction with respect to resource 332, and can result in resource 332 failing without warning while assigned to partition 302.

In system 400 illustrated in FIGS. 4A-4C, on the other hand, operating system 412 has visibility to the complete event history of resource 432 and is in a position to more accurately predict a failure of resource 432 based on its previous event history while assigned to another partition of data processing system 400, and on any new events that may occur during the current assignment of resource 432 to partition 402.

Figure 5:
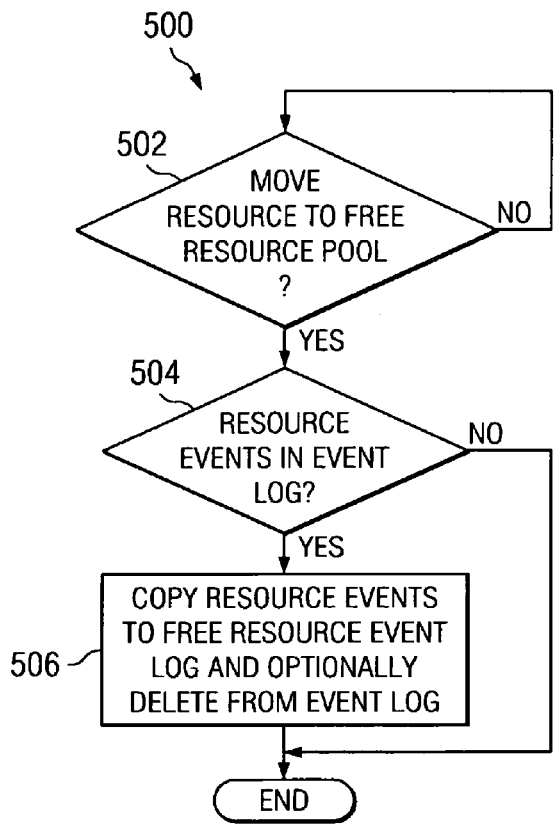
FIG. 5 is a flowchart that illustrates a method for monitoring a resource transferred from a partition to a free resources pool of a data processing system in accordance with a preferred embodiment of the present invention.

FIG. 5 is a flowchart that illustrates a method for monitoring a resource transferred from a partition to a free resources pool of a data processing system in accordance with a preferred embodiment of the present invention. The method is generally designated by reference number 500, and begins by determining if a resource should be moved from a partition to the free resources pool (step 502). If No, the method returns. If Yes, a determination is made if there are events for the resource in an event log associated with the partition (step 504). If No, the resource is transferred to the free resources pool and the method ends. If Yes, any events associated with the resource that are in the event log of the partition are copied to a FREL in the free resources pool (step 506) and the method ends. The events may also be deleted from the partition's event log (step 506), or, alternatively, the event log of the partition may retain the event record of the moved resource. In such alternative embodiment, if the resource is later reassigned to the partition from the free resources pool, any events for the resource in the FREL that are duplicates of errors already recorded in the partition's event log are not transferred. In this alternative embodiment the FREL also maintains a record of the particular partition in which an event occurred with respect to a resource, as well as the number of events for that resource.

Figure 6:
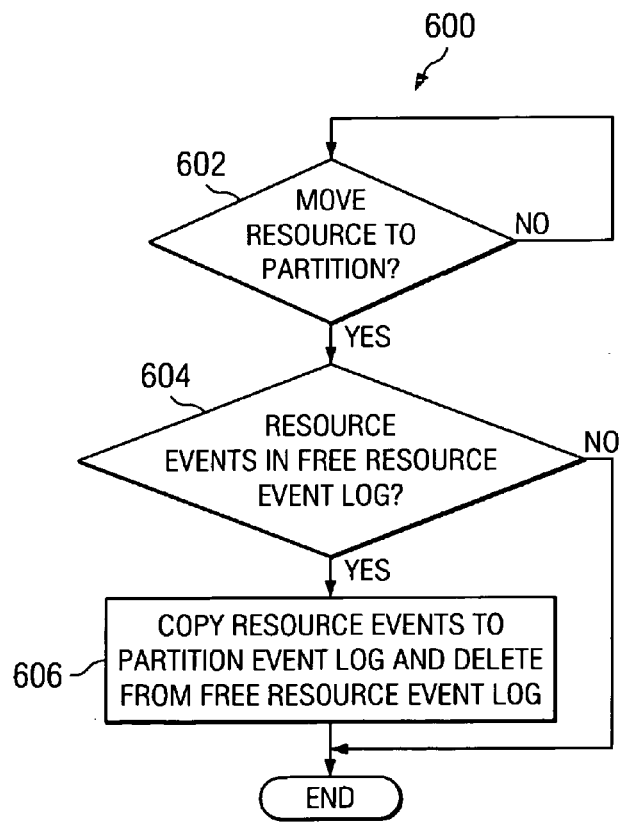
FIG. 6 is a flowchart that illustrates a method for monitoring a resource assigned to a partition from a free resources pool of a data processing system in accordance with a preferred embodiment of the invention.

FIG. 6 is a flowchart that illustrates a method for monitoring a resource assigned to a partition from a free resources pool of a data processing system in accordance with a preferred embodiment of the invention. The method is generally designated by reference number 600 and begins by determining if a resource should be moved from the free resources pool to a partition (step 602). If No, the method returns. If Yes, a determination is made if a FREL associated with the free resources pool has any events logged for the resource (step 604). If No, the resource is assigned to the partition and the method ends. If Yes, the events for the resource in the FREL are copied to the event log of the partition, the log of events of the resource in the FREL is deleted (step 606), and the method ends.

With the present invention, an operating system associated with a partition in a data processing system in which resources are assigned to a partition from a free resources pool has visibility to all events associated with the resources currently assigned to the partition. Accordingly, a more accurate determination of when a particular resource should be replaced can be made based on a system-wide view of all events logged against the resource. This will reduce the occurrences of a resource failure while the resource is assigned to a partition.

In addition, with the present invention, an application is better able to determine which of identical resources should be assigned to a partition that requires additional resources to service a critical application. For example, if a resource has a predictive failure threshold of ten errors of a certain type and eight of those errors have already occurred for that resource as shown by the record for that resource in the FREL, the application may decide to use another, identical resource that has fewer or no errors logged against it in order to mitigate the risk of a failure or of having to perform deferred maintenance.

In general, the present invention provides a method, apparatus and system for monitoring resources capable of being assigned to different partitions of a data processing system from a free resources pool of the data processing system. The invention permits errors or other events associated with resources to be accurately monitored as the resources are assigned to different partitions from the free resources pool during operation of the data processing system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for managing a free resources pool, comprising:
   a plurality of partitions;
   the free resources pool to which at least one resource is assigned, wherein the at least one resource was previously assigned to a partition in the plurality of partitions, wherein the at least one resource is assignable to any partition of the plurality of partitions, and wherein the at least one resource is not currently assigned to the any partition of the plurality of partitions; and
   an event log associated with the free resources pool, the data processing system further comprising a processor and a memory having instructions which, when executed by the processor, stores events within the event log for the at least one resource that occurred while the at least one resource was assigned to a partition in the plurality of partitions.

2. The data processing system according to claim 1, wherein the event log is a first event log and the partition is a first partition, and wherein the instructions, when executed by the processor, transfer the events for the at least one resource from the first event log to a second event log associated with a second partition when the at least one resource is assigned to the second partition from the free resources pool.

3. The data processing system according to claim 1, wherein the event log is a first event log, and wherein the instructions, when executed by the processor, transfer the events for the at least one resource from a second event log of the partition to the first event log when the at least one resource is moved from the partition to the free resources pool.

4. The data processing system according to claim 1, wherein the at least one resource comprises a plurality of resources, and wherein the instructions, when executed by the processor, store the events for each of the plurality of resources that is in the free resources pool in the free resources event log.

5. The data processing system according to claim 1, wherein the events comprise at least one informational message associated with the at least one resource.

6. The data processing system according to claim 1, wherein the events comprise errors encountered by the at least one resource.

7. The data processing system according to claim 1, wherein the data processing system comprises a dynamic logical partitioned data processing system.

8. The data processing system according to claim 1, wherein the data processing system comprises a dynamic capacity on demand data processing system.

9. A method for monitoring at least one resource in a data processing system having a plurality of partitions, the method comprising:
   assigning the at least one resource to a free resources pool from a partition in the plurality of partitions, wherein the at least one resource is assignable to any partition in the plurality of partitions but is not currently assigned to the any partition of the plurality of partitions;
   storing within an event log associated with the free resources pool, using a processor of the data processing system, events for the at least one resource that occurred while the at least one resource was assigned to a partition in the plurality of partitions in an event log associated with the free resources pool.

10. The method according to claim 9, wherein the event log is a first event log and the partition is a first partition, and further comprising:
    transferring the events for the at least one resource from the first event log to a second event log associated with a second partition when the at least one resource is assigned to the second partition from the free resources pool.

11. The method according to claim 9, wherein the event log is a first event log and further comprising:
    transferring the events for the at least one resource from a second event log of the partition to the first event log when the at least one resource is moved from the partition to the free resources pool.

12. The method according to claim 10, and further comprising deleting the events for the at least one resource from the first event log when the at least one resource is assigned to the second partition from the free resources pool.

13. The method according to claim 11, and further comprising:
    deleting the events for the at least one resource from the second event log of the partition when the at least one resource is moved from the partition to the free resources pool.

14. A computer program product comprising:
    a computer recordable-type storage medium having computer usable instructions which, when executed in a data processing system, monitor at least one resource in a data processing system having a plurality of partitions, the computer program product comprising:
    instructions for assigning the at least one resource to a free resources pool from a partition in the plurality of partitions, wherein the at least one resource is assignable to any partition in the plurality of partitions but is not currently assigned to the any partition of the plurality of partitions;

instructions for storing within an event log associated with the free resources pool, events for the at least one resource that occurred while the at least one resource was assigned to a partition in the plurality of partitions in an event log associated with the free resources pool.

15. The computer program product according to claim 14, wherein the event log is a first event log and the partition is a first partition, and further comprising:

instructions for transferring the events for the at least one resource from the first event log to a second event log associated with a second partition when the at least one resource is assigned to the second partition from the free resources pool.

16. The computer program product according to claim 14, and further comprising:

instructions for deleting the events for the at least one resource from the first event log when the at least one resource is assigned to the second partition from the free resources pool.

17. The computer program product according to claim 15, and further comprising:

instructions for deleting the events for the at least one resource from the second event log of the partition when the at least one resource is moved from the partition to the free resources pool.

* * * * *